(12) United States Patent
Kim et al.

(10) Patent No.: US 12,500,255 B2
(45) Date of Patent: Dec. 16, 2025

(54) SYSTEM FOR DISCHARGING RESIDUAL WATER IN FUEL CELL STACK AND METHOD OF CONTROLLING DISCHARGE OF RESIDUAL WATER

(71) Applicants: HYUNDAI MOTOR COMPANY, Seoul (KR); KIA CORPORATION, Seoul (KR)

(72) Inventors: Seon Hak Kim, Yongin-si (KR); Young Hoon Park, Seongnam-si (KR); Da Kyung Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 670 days.

(21) Appl. No.: 17/940,339

(22) Filed: Sep. 8, 2022

(65) Prior Publication Data

US 2023/0081424 A1 Mar. 16, 2023

(30) Foreign Application Priority Data

Sep. 15, 2021 (KR) .................. 10-2021-0123033

(51) Int. Cl.
*H01M 8/04828* (2016.01)
*H01M 8/04303* (2016.01)
*H01M 8/0432* (2016.01)
*H01M 8/04746* (2016.01)
*H01M 8/04858* (2016.01)

(52) U.S. Cl.
CPC ... *H01M 8/04828* (2013.01); *H01M 8/04303* (2016.02); *H01M 8/0432* (2013.01); *H01M 8/04753* (2013.01); *H01M 8/0488* (2013.01); *H01M 2250/20* (2013.01)

(58) Field of Classification Search
CPC .......... H01M 8/04303; H01M 8/0432; H01M 8/04753; H01M 8/04828; H01M 8/0488; H01M 2250/20
See application file for complete search history.

(56) References Cited

FOREIGN PATENT DOCUMENTS

| JP | 2007-048650 | * | 2/2007 |
|---|---|---|---|
| JP | 2007-048650 A | | 2/2007 |
| KR | 10-1866038 B1 | | 6/2018 |
| KR | 2020-0111306 A | | 9/2020 |
| KR | 2020-0113396 A | | 10/2020 |

OTHER PUBLICATIONS

English translation of JP Publication 2007-048650, Feb. 2007.*

* cited by examiner

*Primary Examiner* — Brittany L Raymond
(74) *Attorney, Agent, or Firm* — MCDONNELL BOEHNEN HULBERT & BERGHOFF LLP

(57) ABSTRACT

A system and method for controlling a discharge of residual water remaining in a fuel cell stack after an operation of a fuel cell is ended is provided. The method includes determining whether a preset temperature condition is satisfied, determining whether a preset time condition is satisfied when the temperature condition is satisfied, and discharging residual water in a fuel cell stack while a vehicle travels when the temperature condition and the time condition are satisfied.

14 Claims, 4 Drawing Sheets

SYSTEM FOR DISCHARGING RESIDUAL WATER IN FUEL CELL STACK AND METHOD OF CONTROLLING DISCHARGE OF RESIDUAL WATER

CROSS REFERENCE TO RELATED APPLICATIONS

This application claims under 35 U.S.C. § 119(a) the benefit of Korean Patent Application No. 10-2021-0123033, filed on Sep. 15, 2021, the entire contents of which are incorporated herein by reference.

BACKGROUND

(a) Technical Field

The present disclosure relates to a fuel cell stack, and more particularly, to a system and method for controlling a discharge of residual water remaining in a fuel cell stack after an operation of a fuel cell is ended.

(b) Background Art

A fuel cell refers to an electric generator that converts chemical energy, generated by oxidation of fuel, directly into electrical energy. A hydrogen fuel cell, which uses hydrogen as fuel, has a stack structure in which a plurality of membrane-electrode assemblies is stacked and the membrane-electrode assemblies each have an electrolyte membrane that serves to selectively deliver hydrogen ions and has two opposite sides fitted with and supported by a pair of electrodes.

A hydrogen fuel cell vehicle is attracting attention as an environmentally friendly vehicle because the hydrogen fuel cell vehicle does not emit exhaust gas or contaminants and uses hydrogen, as fuel, which can be acquired consistently from the natural agency. Therefore, recently, the application of the fuel cell to the vehicle gradually increases.

However, there remain several problems to be solved for the development of the hydrogen fuel cell vehicle. For example, the fuel cell stack in the hydrogen fuel cell vehicle generates electrical energy through an electrochemical reaction between high-pressure hydrogen and oxygen in air, and water is produced during this reaction process. However, because the water remaining in the stack interrupts flows of oxygen and hydrogen, the water needs to be discharged from the stack. In addition, when an outside air temperature is low at a location at which the vehicle is parked, the water remaining in the fuel cell stack may be frozen, which causes damage to a unit battery.

To solve this problem, cold shut down (CSD) control is applied to remove the residual water in the fuel cell stack at the time of turning off the vehicle. The CSD refers to a technology for discharging the residual water in the stack by supercharging the stack with air for a predetermined time using the air compressor at the time of turning off the vehicle.

However, an excessive amount of time is required to discharge the residual water during the CSD operation, which causes a deterioration in functional quality. Further, the fuel cell stack is exposed to high electric potential during the CSD operation.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

An object of the present disclosure is to provide a system for discharging residual water in a fuel cell stack and a method of controlling discharge of residual water, which are capable of improving durability of a fuel cell.

The object of the present disclosure is not limited to the above-mentioned object, and other objects, which are not mentioned above, may be clearly understood from the following descriptions by those with ordinary skill in the art (hereinafter, referred to as 'those skilled in the art') to which the present disclosure pertains.

The features of the present disclosure for achieving the above-mentioned objects of the present disclosure and carrying out the characteristic function of the present disclosure to be described below are as follows.

An embodiment of the present disclosure provides a method of controlling a discharge of residual water in a stack of a fuel cell vehicle. The method includes determining whether a preset temperature condition is satisfied, determining whether a preset time condition is satisfied when the temperature condition is satisfied, and discharging residual water in a fuel cell stack while a vehicle travels when the temperature condition and the time condition are satisfied.

Another embodiment of the present disclosure provides a system for discharging residual water in a fuel cell stack. The system includes a fuel cell stack provided in a hydrogen fuel cell vehicle, an air supply device configured to supply air to the fuel cell stack, an outside air temperature sensor configured to detect a temperature around the fuel cell stack, an arrival time providing unit configured to provide an estimated arrival time required for the vehicle to arrive at a destination while the vehicle travels, and a controller configured to control the air supply device, in which the controller receives information on the temperature from the outside air temperature sensor and information on the estimated arrival time from the arrival time providing unit, and discharges in advance residual water in the stack by operating the air supply device while the vehicle travels depending on the information.

The present disclosure provides the system for discharging residual water in the fuel cell stack and the method of controlling discharge of residual water, which are capable of improving durability of the fuel cell.

The effects of the present disclosure are not limited to the above-mentioned effects, and the other effects, which are not mentioned above, will be clearly understood by those skilled in the art from the following description.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
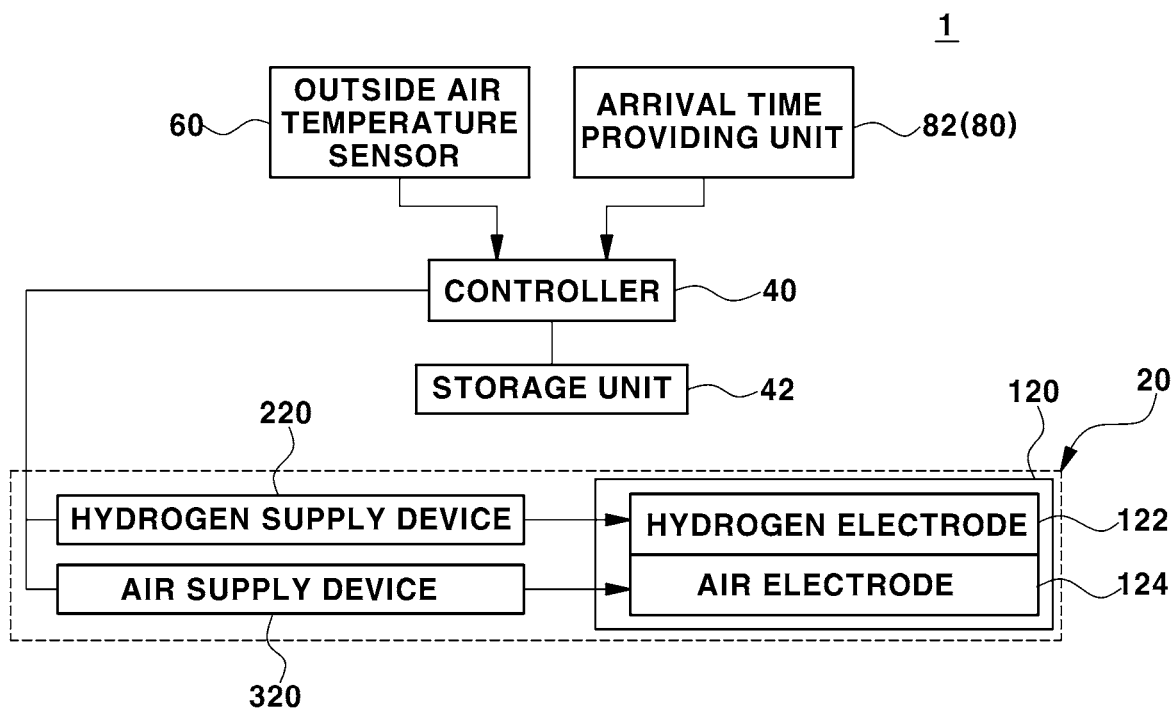
FIG. 1 is a configuration view of a system for discharging residual water in a fuel cell stack according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Specific structural and functional descriptions disclosed in embodiments of the present disclosure are exemplified only for the purpose of explaining embodiments according to the concept of the present disclosure, and the embodiments according to the concept of the present disclosure may be carried out in various forms. In addition, the present disclosure should not be interpreted as being limited to the embodiments disclosed in the present specification, and it should be understood that the present disclosure includes all modifications, equivalents, and alternatives included in the spirit and the technical scope of the present disclosure.

Meanwhile, the terms such as "first" and/or "second" in the present disclosure may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

Like reference numerals indicate like constituent elements throughout the specification. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

When an operation of a hydrogen fuel cell electric vehicle is ended, water produced in a fuel cell remains in a stack. In particular, the residual water in the stack is frozen when an outside air temperature is low, which causes damage to the cell. Recently, the cold shut down (CSD) is performed to discharge the residual water. However, an excessive amount of time is required to discharge the residual water, and the stack is exposed to high electric potential during the CSD, which may adversely affect durability of the stack. In addition, moisture vapor in an air electrode and a hydrogen electrode of the fuel cell is cooled, liquefied, and frozen after the operation of the fuel cell is stopped in the winter season.

To solve this problem, the present disclosure uses destination information of the traveling vehicle and controls and discharges the residual water in the fuel cell in advance before the vehicle arrives at a destination when a specific condition is satisfied. Therefore, it is possible to improve durability of the stack by reducing a CSD process time and preventing the stack from being exposed to high electric potential.

Hereinafter, the present disclosure will be described in detail with reference to the accompanying drawings.

As illustrated in FIG. 1, a system 1 for discharging residual water in a fuel cell stack according to the present disclosure includes a fuel cell system 20 and a controller 40.

The fuel cell system 20 includes a fuel cell stack 120, a hydrogen supply device 220, and an air supply device 320. Because the constituent elements essentially involved in operating the fuel cell system are well known, description of constituent elements less related to the present disclosure, among the constituent elements included in the fuel cell system will be omitted from the present specification.

The fuel cell stack 120 generates electrical energy through an electrochemical reaction between hydrogen and oxygen. To this end, the fuel cell stack 120 includes a hydrogen electrode 122 and an air electrode 124.

The hydrogen electrode 122 is supplied with hydrogen from a hydrogen supply device 220 configured to supply the hydrogen. The hydrogen supplied to the hydrogen electrode 122 is separated into hydrogen ions and electrons. The separated hydrogen ions move to the air electrode 124 through an electrolyte membrane, and the separated electrons move to the air electrode 124 through an external circuit.

The air (oxygen) is supplied to the air electrode 124 from the air supply device 320. The air supply device 320 is configured to supply air to the air electrode 124 of the fuel cell stack 120. As a non-restrictive example, the air supply device 320 may be an air compressor.

In the fuel cell stack 120, the supplied oxygen reacts with the hydrogen ions and the electrons moved to the air electrode 124 to generate electrical energy. The reaction produces water.

The controller 40 directs the operation of the discharge system 1. The controller 40 may be a fuel cell controller or a separate controller configured to communicate with the fuel cell controller 40.

The controller 40 is configured to communicate with various types of constituent elements of the vehicle. In particular, the controller 40 may be configured to communicate with an outside air temperature sensor 60 that detects an atmospheric temperature outside the vehicle, such that the controller 40 may collect information on the outside air temperature. In addition, the controller 40 may communicate with a navigation device 80 of the vehicle. In particular, the controller 40 may collect information on the estimated time required for the currently traveling vehicle to arrive at a destination from an arrival time providing unit 82 of the navigation device 80 of the vehicle. However, the arrival time providing unit 82 for providing the time required for the vehicle to arrive at the destination is not necessarily limited to the navigation device, and any device may be used as the arrival time providing unit as long as the device may calculate the estimated time required for the vehicle to arrive at the destination and provide the estimated time to the vehicle.

The controller 40 includes a storage unit 42 for storing conditions associated with the operation of discharging the residual water. For example, the conditions may include temperatures, time, and the like which are criteria that help determine when to discharge the residual water, pre-discharge, post-discharge, or the like. In addition, the conditions may include information on rotational speeds, flow rates, and the like of the air supply device 320 at respective points in time at the time of discharging the residual water. The conditions will be described below in detail. The storage unit 42 may be integrated with the controller 40 or provided as a separate constituent element.

The controller 40 controls the operation of the discharge system 1 depending on the conditions stored in the storage unit 42. In addition, the controller 40 may control an operating voltage of the fuel cell stack 120 to prevent the stack 120 from being exposed to high electric potential at the time of discharging the residual water.

Figure 2:
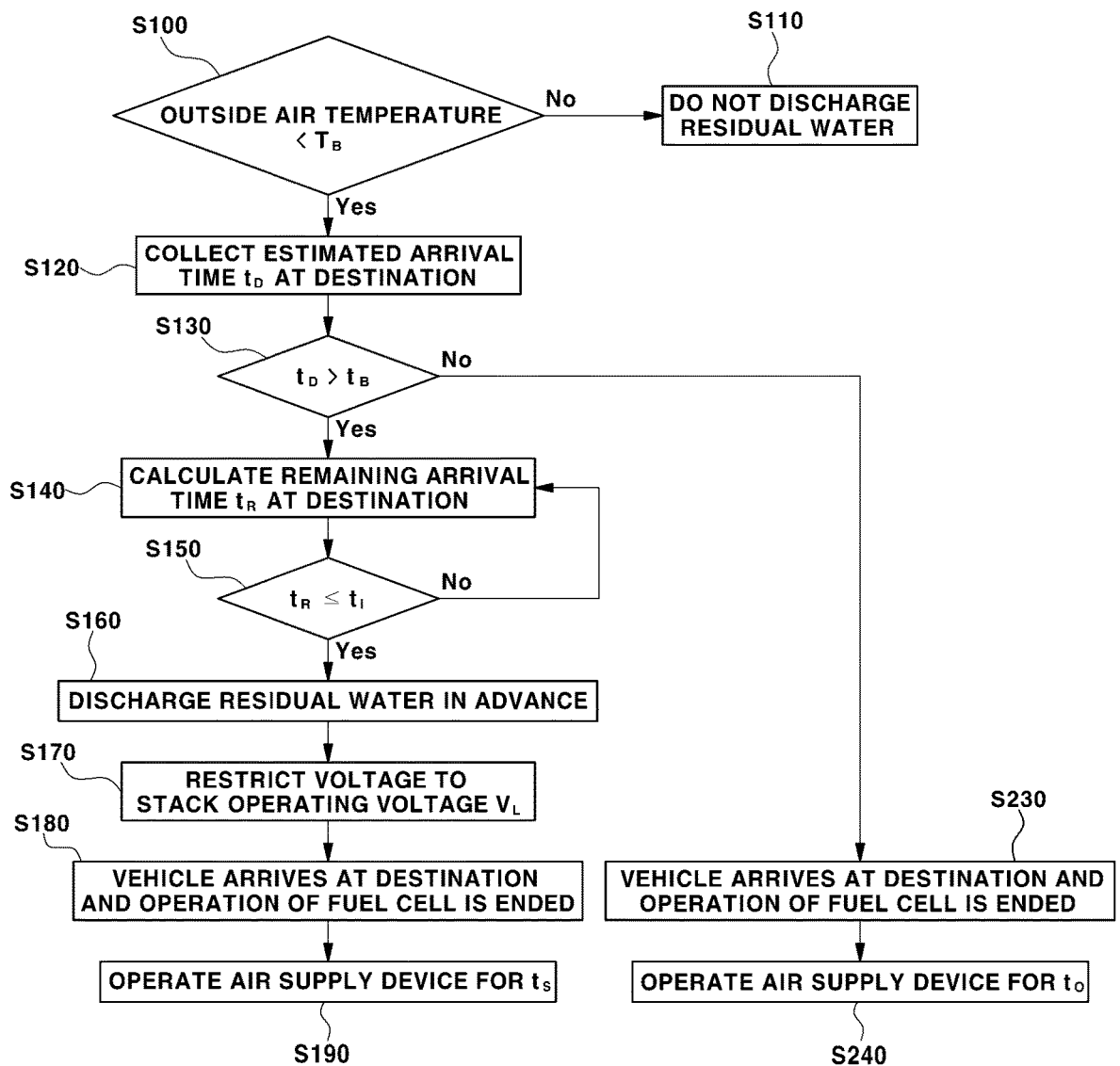
FIG. 2 is a flowchart of a method of controlling discharge of residual water in a fuel cell stack according to an embodiment of the present disclosure.

Hereinafter, a method of controlling discharge of residual water by the discharge system 1 will be described with reference to FIG. 2.

First, when the current temperature condition satisfies a preset temperature condition, the control for discharging the residual water is initiated. That is, when the current temperature condition does not satisfy the preset temperature condition, the discharge of the residual water is not performed while the vehicle travels.

At S100, the traveling vehicle determines whether an outside air temperature is lower than a preset reference temperature $T_B$. The outside air temperature sensor 60 transmits the information on the measured outside air temperature to the controller 40, and the controller 40 compares the information on the received current outside air temperature with the reference temperature $T_B$ stored in the storage unit 42.

At S110, the discharge system 1 is configured not to operate when the current outside air temperature is equal to or higher than the reference temperature $T_B$. The controller 40 determines not to discharge the residual water when the current outside air temperature is equal to or higher than the reference temperature $T_B$.

In contrast, when the current outside air temperature is lower than the reference temperature $T_B$, whether a time condition is satisfied is determined. Whether the time condition is satisfied is determined depending on the comparison between an estimated arrival time $t_D$ required for the vehicle to arrive at the destination and the preset reference time $t_B$.

At S120, the estimated arrival time $t_D$ at the destination is collected. The controller 40 receives the estimated arrival time $t_D$ at the destination from the arrival time providing unit 82 including the navigation device 80 of the vehicle. The estimated arrival time $t_D$ may be the time of arrival at the destination or the remaining time to arrival.

The estimated arrival time $t_D$ at the destination is compared with the preset reference time $t_B$ at S130. The controller 40 compares the estimated arrival time $t_D$ with the reference time $t_B$ stored in the storage unit 42.

When the estimated arrival time $t_D$ is greater than the reference time $t_B$, a series of steps for discharging the residual water are performed while the vehicle travels. When the estimated arrival time $t_D$ is greater than the reference time $t_B$, the controller 40 is configured to calculate the remaining arrival time $t_R$ in real time at S140.

In addition, the controller 40 compares the remaining arrival time $t_R$, which is calculated in real time, with a preset initiation time $t_I$ at S150. The initiation time $t_I$ is a preset period of time retroactively calculated from the destination arrival time and stored in the storage unit 42. The residual water is discharged in advance at a point in time at which the initiation time $t_I$ remains.

When the remaining arrival time $t_R$ is equal to or less than the initiation time the residual water is discharged in advance at S160. That is, when the initiation time $t_I$ is substantially equal to the remaining arrival time $t_R$, the controller 40 controls the air compressor so that the residual water is discharged in advance for the initiation time $t_I$. According to an embodiment of the present disclosure, to discharge the residual water in advance before the arrival at the destination, the controller 40 operates the air supply device 320 at a preset pre-discharge rotational speed $R_P$ and sets an air supply supercharge ratio to a preset supercharge ratio SR. In this case, the pre-discharge rotational speed $R_P$ and the preset supercharge ratio SR are stored as a predetermined value in the storage unit 42 to implement pre-discharge or discharge in advance the residual water. When the initiation time $t_I$ is a specific time, the controller 40 discharges the residual water by operating the air compressor until the vehicle arrives at the destination from the initiation time $t_I$.

In addition, the controller 40 restricts an operating voltage of the stack 120 to a set voltage $V_L$ which is a preset voltage value at S170. When the remaining arrival time $t_R$ reaches the initiation time $t_I$, a stack voltage may increase because of an excessive supply of air. Therefore, the controller 40 restricts the voltage to the set voltage $V_L$ by controlling the voltage, thereby preventing the durability of the stack from deteriorating.

When the vehicle reaches the destination and then the operation of the fuel cell is ended at S180 after the residual water is discharged in advance while the vehicle travels, the operation of the discharge system 1 for discharging the residual water is additionally performed. The controller 40 operates the air supply device 320 for a shortened operating period $t_S$, which is a preset time, to discharge the residual water at S190. The shortened operating period $t_S$ is a time value preset and stored in the storage unit 42 to discharge the residual water in the vehicle from which the residual water is discharged in advance. In addition, the shortened operating period $t_S$ has a value smaller than a value of an operating period $t_O$ to be described below. According to an embodiment of the present disclosure, the air supply device 320 operates for the shortened operating period $t_S$ at a post-discharge rotational speed RN which is a preset rotational speed. According to another embodiment of the present disclosure, the air supply flow rate is set to a preset post flow rate MN for the shortened operating period $t_S$ of the air supply device 320.

At S130, when the estimated arrival time $t_D$ at the destination is equal to or less than the preset reference time $t_B$, the residual water is not discharged in advance while the vehicle travels. The case in which the estimated arrival time $t_D$ is equal to or less than the reference time $t_B$ may include a case in which the vehicle has traveled a short distance or a case in which it is difficult for the arrival time providing unit 82 to provide the arrival time (e.g., a case in which the destination is not set in the navigation device 80).

When the controller 40 determines that the estimated arrival time $t_D$ at the destination is equal to or less than the reference time $t_B$, the controller 40 does not discharge the residual water while the vehicle travels. Instead, when the vehicle reaches the destination and the operation of the fuel cell is ended, the controller 40 discharges the residual water.

At S230, when the vehicle reaches the destination and then the operation of the fuel cell is ended, the system for discharging the residual water operates. The controller 40 operates the air supply device 320 for the preset operating period $t_O$ to discharge the residual water at S240. The operating period $t_O$ is a preset time value for the CSD and stored in the storage unit 42. According to an embodiment of the present disclosure, to operate the air supply device 320, the air supply device 320 operates for the operating period $t_O$ at the post-discharge rotational speed $R_N$ which is the preset rotational speed.

According to the present disclosure, when the residual water is discharged in advance through steps S140 to S190, the CSD process time may be significantly reduced. Therefore, it is possible to solve the problem that the fuel cell is exposed to the high electric potential. Since the residual water is discharged in advance for the initiation time $t_1$, the discharge of the residual water is required only for a shorter time after the operation is ended. Therefore, when the residual water is discharged in advance, the CSD is performed for the shortened operating period $t_S$ instead of the operating period $t_O$. Therefore, the shortened operating period $t_S$ is smaller than the operating period $t_O$ which is the CSD time for which the residual water is not discharged in advance through steps S230 to S240.

In addition, since the present disclosure controls the voltage of the stack 120 while discharging the residual water in advance, it is possible to prevent the stack from being exposed to the high electric potential during the process of discharging the residual water, thereby improving the durability of the fuel cell system.

Figure 3:
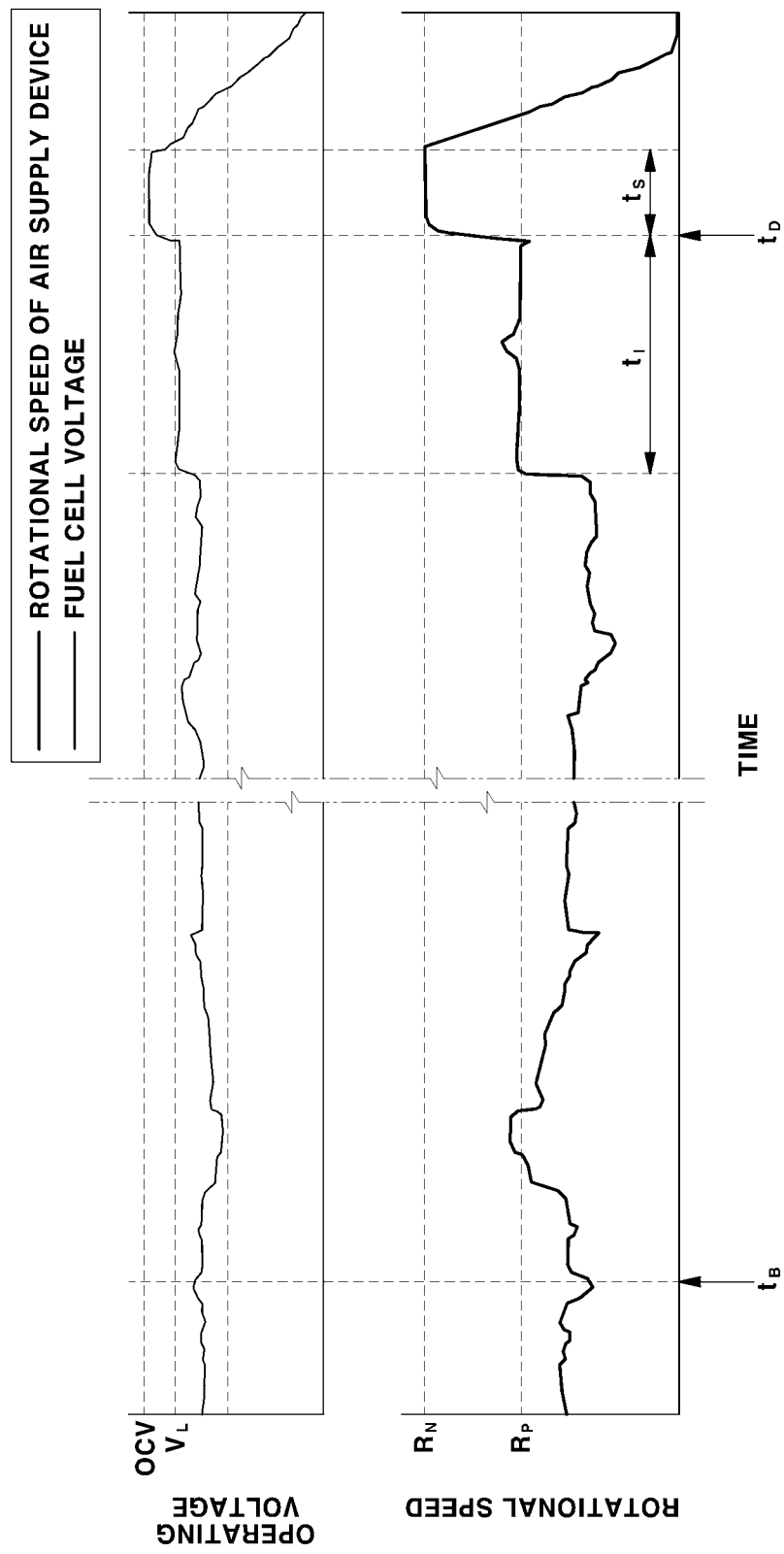
FIG. 3 is a graph illustrating operating voltages of the fuel cell stack and rotational speeds of an air compressor based on the time when residual water is discharged in advance in accordance with the method of controlling discharge of residual water in the fuel cell stack according to an embodiment of the present disclosure.

FIG. 3 is a graph illustrating operating voltages of the stack 120 and rotational speeds of the air supply device 320, i.e., the air compressor based on the time when the estimated arrival time $t_D$ at the destination is greater than the reference time $t_B$.

Referring to FIG. 3, when the estimated arrival time $t_D$ at the destination is greater than the reference time $t_B$, the remaining arrival time $t_R$ is continuously calculated, and the calculated remaining arrival time $t_R$ is compared with the initiation time $t_I$. When the remaining arrival time $t_R$ reaches the initiation time $t_1$, the air compressor operates at the pre-discharge rotational speed $R_P$. In this case, the required air flow rate is higher than the pre-discharge rotational speed $R_P$, the air compressor may operate at a speed equal to or higher than the pre-discharge rotational speed $R_P$.

When the remaining arrival time $t_R$ reaches the initiation time $t_1$, the operating voltage of the stack 120 may increase because of an excessive supply of air. The present disclosure controls the voltage to control an upper limit of the stack voltage to the set voltage value $V_L$ that does not impair the durability of the stack 120.

When the vehicle arrives at the destination and the operation is ended, the residual water, which is produced in the stack 120 and not yet discharged, is additionally discharged for the shortened operating period $t_S$. In this case, when the voltage control is performed, additional water is produced due to the generation of electric current and the voltage reaches an open circuit voltage (OCV).

Figure 4:
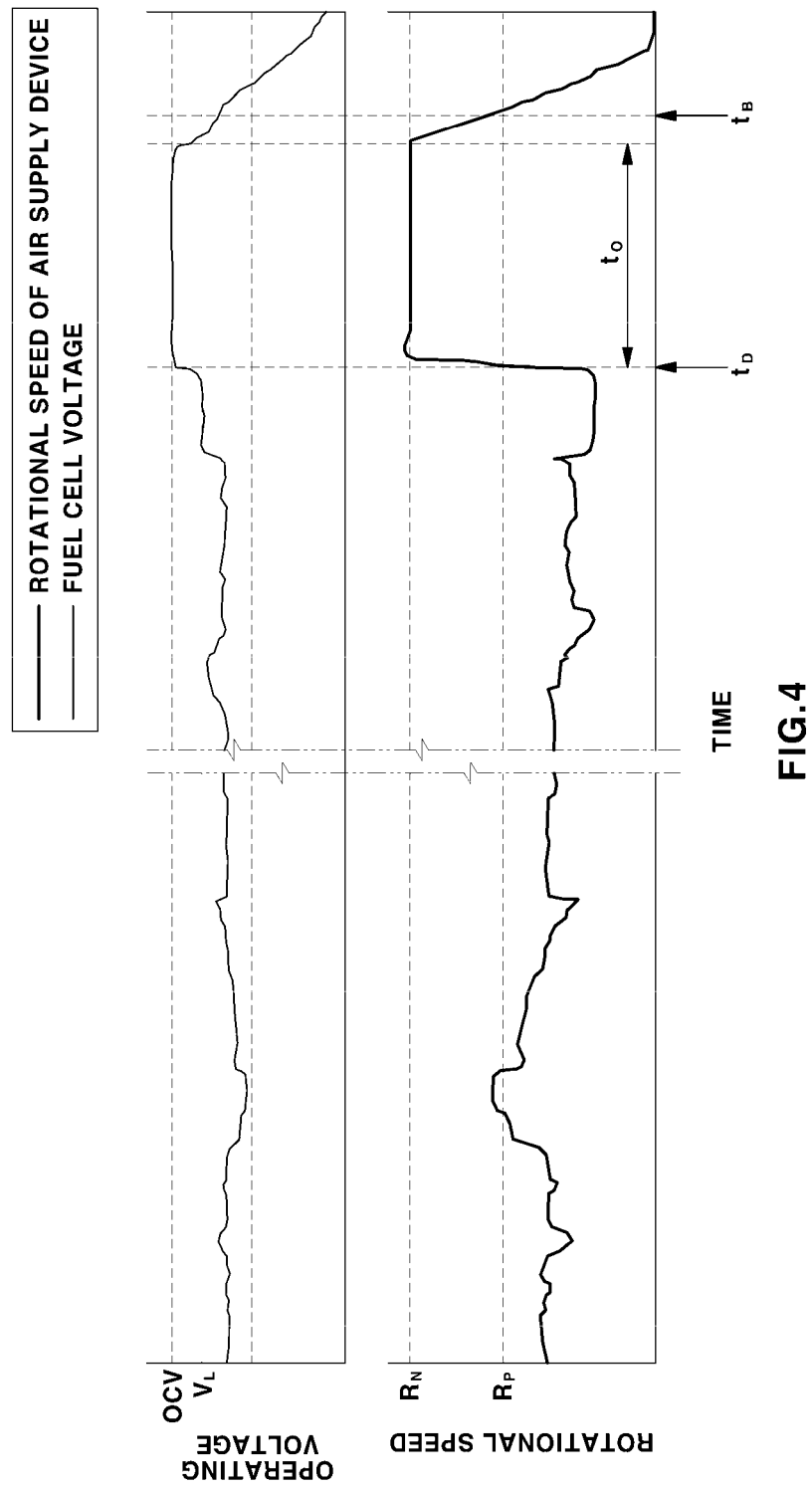
FIG. 4 is a graph illustrating operating voltages of the fuel cell stack and rotational speeds of the air compressor based on the time when residual water is not discharged in advance in accordance with the method of controlling discharge of residual water in the fuel cell stack according to an embodiment of the present disclosure.

FIG. 4 illustrates operating voltages of the stack 120 and rotational speeds of the air compressor based on the time when the residual water is not discharged in advance when the estimated arrival time $t_D$ at the destination is equal to or less than the reference time $t_B$.

Referring to FIG. 4, when the vehicle arrives at the destination and the operation is ended, the air compressor operates for the operating period $t_O$ at the post-discharge rotational speed $R_N$. In this case, when the voltage control is performed, additional water is produced because of the application of electric current. Therefore, the voltage control is not performed.

When the residual water is discharged in advance as illustrated in FIG. 3, the produced water in the stack 120 is discharged in advance by increasing the supply amount of air for the initiation time $t_I$ before the operation of the fuel cell is ended. Therefore, the shortened operating period $t_S$, which is shorter than the operating period $t_O$ for which the residual water is not discharged in advance, is required. As a result, it is possible to reduce the post-discharge time. The long-time exposure to the OCV accelerates the degradation of the stack. However, the pre-discharge may reduce a total time for which the stack 120 is exposed to the OCV, thereby improving the durability.

According to the present disclosure, since the residual water in the stack is discharged in advance while the vehicle travels, it is possible to reduce the post-processing discharge time after the operation of the fuel cell is ended even though the total discharge amount of residual water remains the same. Further, the reduction in post-processing time may improve marketability.

In addition, the present disclosure may avoid the high electric potential by controlling the voltage while discharging the produced water in advance while the vehicle travels, thereby improving the durability.

In addition, the present disclosure may reduce the time for which the fuel cell is exposed to the high electric potential by reducing the post-processing time after the operation of the fuel cell is ended, thereby improving the durability.

The present disclosure, which has been described above, is not limited by the aforementioned embodiment and the accompanying drawings, and it will be obvious to those skilled in the art to which the present disclosure pertains that various substitutions, modifications and alterations may be made without departing from the technical spirit of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A method of controlling a discharge of residual water in a stack of a fuel cell vehicle, the method comprising:
   determining, by a controller, whether a preset temperature condition is satisfied;
   determining whether a preset time condition is satisfied in response to determining that the preset temperature condition is satisfied; and
   discharging residual water in a fuel cell stack during traveling of a vehicle based on determining that the preset temperature condition and the preset time condition are satisfied, wherein determining whether the preset time condition is satisfied comprises:
   collecting an estimated arrival time required for the vehicle to arrive at a destination based on the preset temperature condition being satisfied; and
   determining that the preset time condition is unsatisfied based on the estimated arrival time being less than or equal to a preset reference time;
   wherein the method further comprises post-discharging the residual water in the fuel cell stack after the traveling of the vehicle is ended, without discharging the residual water during the traveling of the vehicle, based on the preset time condition being unsatisfied.

2. The method of claim 1, wherein it is determined that the temperature condition is satisfied based on a current outside air temperature is being lower than a preset reference temperature.

3. The method of claim 1, wherein determining whether the preset time condition is satisfied further comprises:
   determining that the preset time condition is satisfied based on the estimated arrival time is being more than the preset reference time.

4. The method of claim 3, wherein determining whether the time condition is satisfied further comprises:
   calculating a remaining arrival time until arriving at the destination in response to determining that the estimated arrival time is greater than the preset reference time; and
   comparing the remaining arrival time with a preset initiation time;
   wherein the residual water is discharged in advance based on the remaining arrival time reaching a preset initiation time during traveling of the vehicle.

5. The method of claim 1, wherein discharging residual water comprises rotating, at a preset pre-discharge rotational speed, an air compressor configured to supply air into the fuel cell stack.

6. The method of claim 5, wherein discharging residual water further comprises setting an air supply supercharge ratio of the air compressor to a preset set supercharge ratio.

7. The method of claim 1, wherein discharging residual water comprises restricting an operating voltage of the fuel cell stack to a preset voltage which is a voltage defining an upper limit, and
   wherein the preset voltage is lower than an open circuit voltage of the fuel cell stack.

8. The method of claim 1, further comprising:
   additionally discharging the residual water in the fuel cell stack for a preset shortened operating period based on the traveling of the vehicle is being ended.

9. The method of claim 8, wherein additionally discharging the residual water comprises:
   operating, at a preset post-discharge rotational speed for the shortened operating period, an air compressor configured to supply air into the fuel cell stack; or
   setting a supply flow rate of air to be supplied into the stack to a preset flow rate and operating the air compressor for the shortened operating period.

10. The method of claim 8, wherein post-discharging the residual water comprises:
    operating an air compressor at a preset post-discharge rotational speed for a preset operating period after the traveling of the vehicle is ended; or
    setting a supply flow rate of air to be supplied into the stack to a preset flow rate and operating the air compressor for the operating period.

11. The method of claim 10, wherein the operating period is longer than the shortened operating period.

12. A system for discharging residual water in a fuel cell stack, the system comprising:
    a fuel cell stack provided in a hydrogen fuel cell vehicle;
    an air supply device configured to supply air to the fuel cell stack;
    an outside air temperature sensor configured to detect a temperature around the fuel cell stack;
    an arrival time providing unit configured to provide an estimated arrival time required for the vehicle to arrive at a destination during traveling of the vehicle; and
    a controller configured to control the air supply device;
    wherein the controller is configured to:
    receive information about the temperature from the outside air temperature sensor, and receive information about the estimated arrival time from the arrival time providing unit; and
    discharge in advance residual water in the stack by operating the air supply device during traveling of the vehicle depending on the information received, and the controller is further configured to post-discharge the residual water in the fuel cell stack after the traveling of the vehicle is ended without discharging the residual water during the traveling of the vehicle based on determining that the estimated arrival time is less than or equal to a preset reference time.

13. The system of claim 12, wherein the controller is configured to control an operating voltage of the stack to a voltage equal to or lower than a preset voltage during discharging of the residual water in advance.

14. The system of claim 12, wherein the arrival time providing unit is a navigation device of the vehicle.

\* \* \* \* \*